United States Patent [19]

Hämeen-Anttila

[11] 3,952,444

[45] Apr. 27, 1976

[54] SPOON LURE

[76] Inventor: Yrjö Sakari Hämeen-Anttila, Alakiventie 1 C 35, Helsinki, Finland, 00920

[22] Filed: July 22, 1974

[21] Appl. No.: 490,671

[30] Foreign Application Priority Data

Oct. 31, 1973  Finland .......................... 3372/73

[52] U.S. Cl. .................................. 43/34; 43/36
[51] Int. Cl.² ..................................... A01K 83/02
[58] Field of Search ............... 43/34, 35, 36, 37, 15

[56] References Cited
UNITED STATES PATENTS

| 1,639,766 | 8/1927 | Fisher | 43/37 |
| 2,521,555 | 9/1950 | Widmer | 43/35 |
| 2,552,113 | 5/1951 | Prentice | 43/35 |
| 2,576,532 | 11/1951 | Nudell | 43/35 |
| 2,589,343 | 3/1952 | Cieslik | 43/35 |
| 2,589,343 | 3/1952 | Cieslik | 43/35 |
| 3,816,953 | 6/1974 | Hameen-Antilla | 43/35;36 |

*Primary Examiner*—G. E. McNeill
*Assistant Examiner*—Peter K. Skiff
*Attorney, Agent, or Firm*—Jay L. Chaskin

[57] ABSTRACT

A spoon lure with spring loaded hooks operatively connected to a plunger extending axially along the lure. The hooks are loaded by pulling or pushing the plunger in a direction away from or towards the hooks against the force of the spring and they are locked into said loaded position by pushing a latch into a notch provided in said plunger. The hooks are protected by an appropriately designed back part of the lure when in loaded position. Releasing occurs through compressing of trigger means forming part of the spoon lure whereby the latch is released from the notch with following releasing of the spring resulting in thrusting of the hooks into acting position.

4 Claims, 7 Drawing Figures

SPOON LURE

BACKGROUND OF THE INVENTION

1. Field of the Invention

The present invention relates to a fish lure and especially to a spoon lure type having spring loaded hooks which by loading are retracted into a protected position where the hooks are not protruding outside the lure comprising only a single spoonformed part in addition to the hooks and their loading elements.

2. Description of the Prior Art

In the past there has been used metal pieces of spoon form and fish-shaped wooden, metal, plastic or the like objects, both types having in the back part and even on both sides hanging hooks. The disadvantage of these hooks has been that the hooks have been caught in underwater grass and rocks and, when the lure has been used in casting, even in trees and people on the shore. Furthermore the detaching of the trapped fish from the hooks has been difficult.

SUMMARY OF THE INVENTION

In accordance with this invention there is provided a spoon lure comprising at least one spring loaded hook operatively connected to a plunger extending axially along the lure, and trigger means being arranged to lock the plunger and the hooks in their loaded position after loading of the user and to release them upon compressing of the trigger means by a fish. The hooks thus loaded and released are protected by an appropriately designed bend of the back part of the lure when in loaded position and are guided through openings when released and forced outwardly into acting position.

Loading of the hooks can be performed either by pulling or pushing the plunger, which during this movement is drawing the hooks in the protected loaded position.

The plunger with the parts belonging thereto can either be provided in the concave part of the spoon formed shell with the trigger means below the plunger or the plunger with belonging parts can be encased in a hollow tube in which case the trigger means are performed as the spoon formed part.

By protecting the hooks in a specially shaped bend in the back part of the lure when the lure is latched the hooks are not easily caught in grass, underwater rocks, trees or people and thus the disadvantages connected with known spoon lures described above are eliminated.

DESCRIPTION OF THE PREFERRED EMBODIMENT

Figure 1:
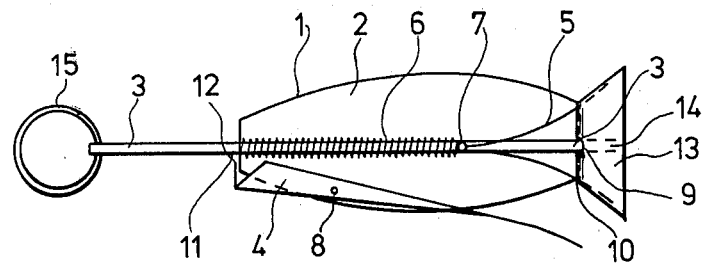
FIG. 1 is a longitudinal view of the novel fish lure as seen from the concave side and in latched position.
Figure 2:
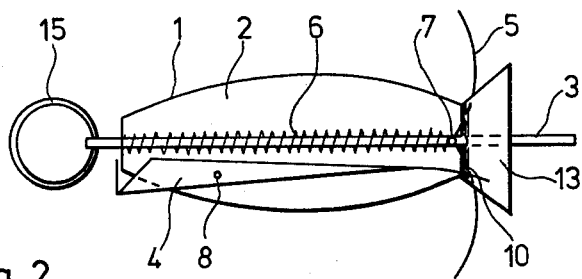
FIG. 2 is a corresponding view as in FIG. 1 but disclosing the lure in released position.
Figure 3:
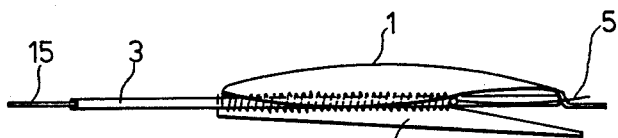
FIG. 3 is a side view of the lure according to FIG. 1.

In FIGS. 1 to 3 the lure body is indicated with 1, the concave side thereof with 2, the plunger with 3, the trigger with 4, the hooks with 5, the helical spring surrounding the plunger with 6, a pivot at which the hooks are fastened with 7, the hinge point between the trigger and the lure body with 8, a hole for the plunger in the bend of the back part of the lure with 9 and holes for the hooks in said bend with 10, the notch in the plunger with 11 and the latch of the trigger with 12, the back part of the lure with 13, the guiding groove provided in said back part with 14 and the pulling ring in the front end of the plunger with 15.

In a construction according to FIGS. 1–3 the latching and triggering mechanism of the lure has been fitted on its concave side 2. The lure is latched by pulling the plunger 3 and the hooks 5 attached thereto with a pivot 7 in a direction away from the hooks on the concave side 2 of the body 1. Thereby the latch 12 of the trigger 4 hinged at 8 to the body 1 is engaged in the notch 11 in the plunger 3 thus locking the plunger and the hooks in the loaded position. A pulling ring of the plunger is indicated by 15. The lure is released by pressing the back end of the trigger 4, whereby the latch 12 of the trigger is detached from the notch 11 of the plunger 3, and pressed by the spring 6 the plunger springs out through the opening 9 in the bend of the back part of the lure. Said bend means the borderline between the bodypart and the tailpart of the lure which borderline is bent some 90° to continue in the tail-part extending parallel to the plunger. The hooks 5 attached to the plunger 3 with the pivot 7 then also spring out through their openings 10 in the bend of the back part of the lure. Thereby the tail part 13 serves as a supporting and guiding surface for the plunger and the hooks. For guiding the plunger the tail has a guiding groove 14. Latching can evidently be performed also by pushing at the other end of the plunger.

Figure 4:
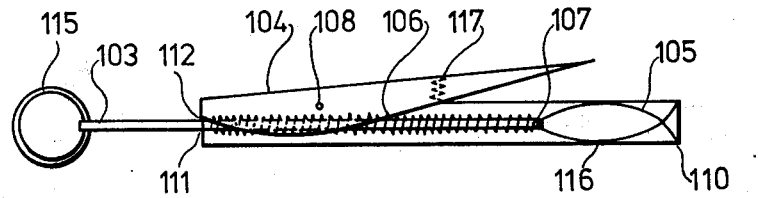
FIG. 4 shows a spoon lure especially adapted for fishing on the bottom, in loaded position and being loadable through pulling of the plunger.
Figure 5:
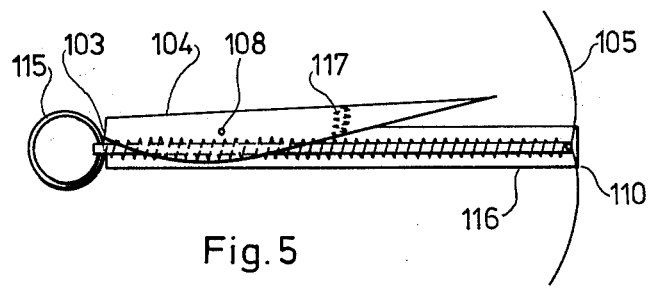
FIG. 5 shows the spoon lure according to FIG. 4, in released position.

In FIGS. 4 and 5 the hollow tube encasing the plunger is indicated with 116, the holes for the hooks in the back end thereof with 110, and a spring between the trigger and the tube with 117. The other reference characters have corresponding characters in FIGS. 1–3 referring to corresponding details.

In the construction according to FIGS. 4 and 5 the latching and triggering device has been fitted in a special casing 116, which preferably is a transparent plastic tube, and the hooks 105 spring out through openings 110 in its back end when the lure is released. The fish-shaped body 104 of the spoon serves as a trigger. The spring 117 of the trigger serves to keep the trigger in its loaded position. The lure is latched by pulling the ring 115 of the plunger 103. Releasing occurs when the back part of the trigger 104 is compressed upon biting of a fish.

Figure 6:
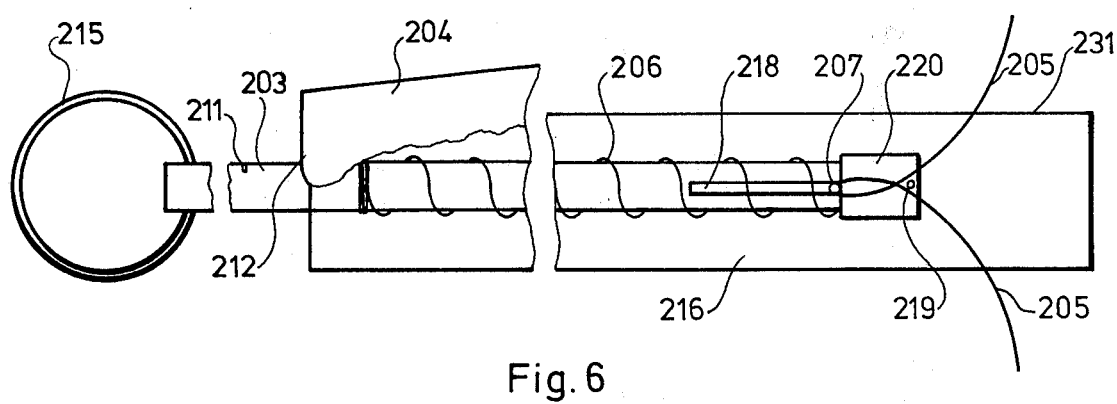
FIG. 6 shows in enlargement a spoon lure of the same type as in FIGS. 4 and 5 in released position and being loadable through pushing of the plunger, with part of the trigger broken away.
Figure 7:
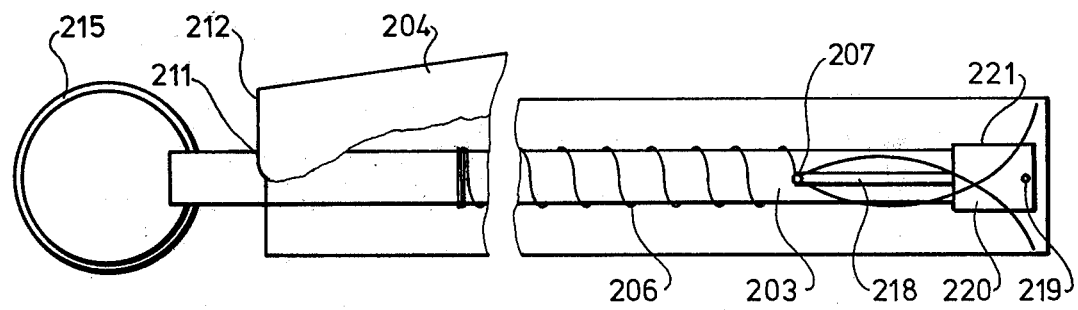
FIG. 7 shows the spoon lure according to FIG. 6 but in loaded position.

In FIGS. 6 and 7 a longitudinal slot provided in the plunger for enabling the plunger to move in respect of pivot 207 is indicated with 218, a rod for guiding the hooks into acting position is indicated with 219, a guiding element at the end of the plunger is indicated with 220 and longitudinal slots provided therein are indicated with 221 while corresponding slots provided in the surrounding tube are indicated with 231.

The other characters have corresponding characters in FIGS. 1–5 referring to corresponding details.

The embodiments according to FIGS. 6 and 7 are much similar to those shown in FIGS. 4 and 5, except the loading which is performed by pushing the plunger in the direction towards the hooks, whereagainst the loading according to the other embodiments has been performed by pulling the plunger in the direction away from the hooks. Because of this difference the pivot 207 at which the hooks are fastened is stationary in respect of the plunger. For this reason the plunger is slotted 218 at its back part for enabling the plunger to move forward (from right to left in the drawings) during the loading movement past the pivot 207. A guiding element 220 is provided at the back end of the plunger 203 for guiding the hooks to and from acting position. For this purpose guiding element 220 is provided with a rod 219 which is perpendicular to the moving direction of the plunger and perpendicular to the plane of the hooks 205, thus forcing the hooks outwardly into acting position during the forward movement of the plunger 203. The guiding element as well as the surrounding tube 216 are provided with slots for the hooks. Retracting of the hooks into the protected position inside the tube 216 occurs during the loading movement of the plunger (from left to right) by means of the hollow end part of the plunger acting as a guiding element. In other respects the embodiments of FIGS. 6 and 7 are similar to the embodiments according to FIGS. 4 and 5.

The spoon lure according to FIGS. 1–3 can be varied to be loaded by pushing, in which case a mechanism corresponding to the one shown in FIGS. 6 and 7 should be employed.

The lure can be manufactured from metal, plastic, or other similar materials.

It is understood that the present invention is not limited to the embodiment described and shown in the drawing. In particular, it includes all means that constitute technical equivalence of the various elements and means described and shown, as well as their combination, if they are within the scope of the appended claims.

What I claim is:

1. A spoon lure comprising a lure body;
   a plunger extending axially through the length of the lure body and extending beyond one end thereof;
   at least one hook located within the lure body and connected to the plunger, the hook having a slightly arcuate curvature without a reversal of curvature;
   a spring located entirely within the lure body and helically surrounding the plunger for substantially its entire length when the spring is in its released state, the spring urging the vigourous projection of the hook externally of the lure body;
   trigger means for maintaining the spring in compression and to release the spring, the trigger means comprising a trigger located externally of and pivotably connected to the lure body and extending substantially for the entire length of the lure body, the trigger having a latch for engagement with a notch in a portion of the plunger adjacent to but extending beyond said one end of the lure body;
   means in the other end of said lure body for guiding the hook or hooks during projection externally of the lure body;
   the hook or hooks being loaded by being drawn into the lure body by moving said plunger against the force of the spring away from the hook or hooks and engaging said latch with said notch.

2. A spoon lure according to claim 1, wherein the other end is designed as a fish tail with the sides parallel to the retracted hook or hooks, said guiding means being holes arranged in the border between the body and the tail of the lure, at which border the tail is bent approximately 90° to the plunger, the tail being bent a further approximately 90° so as to be substantially parallel with the plunger.

3. A spoon lure comprising a lure body;
   a plunger extending axially through the length of the lure body and extending beyond one end thereof;
   at least one hook located within the lure body and connected to the plunger, the hook having a slightly arcuate curvature without a reversal of curvature;
   a spring located entirely within the lure body and helically surrounding the plunger for substantially its entire length when the spring is in its released state, the spring urging the vigourous projection of the hook externally of the lure body;
   trigger means for maintaining the spring in compression and to release the spring, the trigger means comprising a trigger located externally of and pivotably connected to the lure body and extending substantially for the entire length of the lure body, the trigger having a latch for engagement with a notch in a portion of the plunger adjacent to but extending beyond said one end of the lure body;
   means in the other end of said lure body for guiding the hook or hooks during projection externally of the lure body;
   the hook or hooks being loaded by being drawn into the lure body by moving said plunger toward the hook or hooks and engaging said latch with said notch.

4. A spoon lure according to claim 3, wherein the other end of the lure body is designed as a fish tail with sides parallel to the retracted hook or hooks and wherein the plunger has a slot at one end to enable the plunger to move axially of a stationary pivot to which the hook or hooks are fastened;
   a rod disposed within a hook guide element located at said one end of the plunger, the rod extending perpendicular to the moving direction of the plunger and perpendicular to the plane of the hook or hooks for guiding said hook or hooks outwardly into acting position and inwardly into the lure body, respectively;
   the hook guiding element having therein an opening for said hook or hooks.

* * * * *